United States Patent Office 3,320,242
Patented May 16, 1967

3,320,242
17β,20-EPOXY STEROIDS AND METHODS FOR THEIR PRODUCTION
Paul L. Creger, Ann Arbor, Mich., assignor to Parke, Davis & Company, Detroit, Mich., a corporation of Michigan
No Drawing. Filed Nov. 12, 1964, Ser. No. 410,729
3 Claims. (Cl. 260—239.55)

The present invention relates to new steroid compounds. More particularly, the invention relates to the new compounds 17β,20-epoxy - 17α-methylandrost-5-en-3β-ol and 17β,20-epoxy - 17α-methylandrost - 4-en-3-one, and to methods for their production.

In accordance with the invention, 17β,20-epoxy-17α-methylandrost-5-en-3β-ol is produced by reacting a lower acyl ester of 3β-hydroxyandrost-5-en-17-one with dimethylsulfonium methylide of the formula $$(CH_3)_2S=CH_2$$

whereby an epoxide ring is formed and the ester group is converted to a hydroxyl group. Some examples of suitable lower acyl esters of 3β-hydroxyandrost-5-en-17-one are the lower alkanoic acid esters such as the acetate and propionate. The process is carried out in any of a variety of solvents, preferably dimethyl sulfoxide in mixture with tetrahydrofuran, ethylene glycol dimethyl ether, diethylene glycol dimethyl ether, or tetrahydrothiophene 1,1-dioxide. The reaction solvent should be selected so that it is in the liquid state at the temperature at which the process is carried out. The preferred solvent is a mixture of dimethyl sulfoxide and tetrahydrofuran. Because dimethyl sulfonium methylide is relatively unstable, especially at elevated temperatures, it is preferably used in excess of the theoretical amount, and the reaction with dimethylsulfonium methylide is carried out at a temperature below room temperature. It is customary to use at least two or three times the calculated quantity of dimethylsufonium methylide and a larger excess is not disadvantageous. The reaction with dimethylsulfonium methylide is carried out at a temperature between about −70 and +10° C. but not lower than the freezing point of the reaction mixture. The reaction with dimethylsulfonium methylide is relatively rapid and is essentially complete within a period of less than five hours. The product is isolated following dilution of the mixture with water.

The dimethylsulfonium methylide employed as a starting material in the foregoing process is preferably prepared and used in situ by the reaction of sodium hydride with dimethyl sulfoxide to form the methylsulfinyl carbanion of the formula

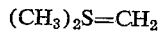

followed by reaction with trimethylsulfonium iodide to form a solution of dimethylsulfonium methylide.

Also in accordance with the invention, 17β,20-epoxy-17α-methylandrost-4-en-3-one is produced by reacting 17β,20-epoxy-17α-methylandrost-5-en-3β-ol with a ketone in the presence of an aluminum alkoxide or an aluminum aryloxide. In this reaction the ketone serves as a hydrogen acceptor. It can be an aliphatic ketone, such as acetone, diethyl ketone, methyl ethyl ketone, or diisopropyl ketone; or a cycloaliphatic ketone, such as cyclopentanone or cyclohexanone. A preferred ketone for use in this reaction is cyclohexanone. Some examples of suitable aluminum alkoxides are aluminum isopropoxide and aluminum t-butoxide. A suitable aluminum aryloxide is aluminum phenoxide. The reaction can be carried out in any of a variety of unreactive solvents, typically aromatic hydrocarbons such as benzene, toluene or xylene. The ketone employed as hydrogen acceptor is normally used in a considerable excess, the preferred quantity being from 10 to 25 times the theoretical amount. The amount of aluminum alkoxide or aluminum aryloxide can be varied over a considerable range. Most commonly about 0.5 mole of this compound is used for each mole of 17β,20-epoxy-17α-methylandrost-5-en-3β-ol employed in the reaction. However the relative quantity of the aluminum alkoxide or aluminum aryloxide can be varied from between about 0.25 to 2.0 moles without disadvantageous effect on the reaction. The time and temperature of the reaction are somewhat dependent on the particular ketone used as hydrogen acceptor and the ratios of the reactants. With refluxing toluene as the solvent and cyclohexanone as the hydrogen acceptor, the reaction is normally complete within from 30 minutes to 4 hours. Isolation of the reaction product is facilitated by washing the reaction mixture with an aqueous acid or with aqueous sodium potassium tartrate to remove aluminum compounds, and by distillation of the volatile components.

The compounds of the invention are useful chemical intermediates. They are of value as intermediates in the synthesis of hormonally-active compounds of the androstane series according to procedures generally known in steroid chemistry. For example, 17β,20-epoxy-17α-methylandrost-5-en-3β-ol is reduced by reaction with lithium aluminum hydride in anhydrous ether followed by hydrolysis of the product to give 17α-methylandrost-5-ene-3β,17β-diol; which is then converted to 17-methyltestosterone by oxidation with cyclohexanone and aluminum isopropoxide in toluene solution. Alternatively, 17β,20 - epoxy-17α-methylandrost-4-en-3-one is reacted with pyrrolidine to form 3-pyrrolidino-17β,20-epoxy-17α-methylandrosta-3,5-diene, which is reduced by reaction with lithium aluminum hydride in anhydrous ether followed by hydrolysis of the product to give 3-pyrrolidino-17α-methylandrosta-3,5-dien-17β-ol. The latter compound is hydrolyzed with aqueous acid to give 17-methyltestosterone.

The invention is illustrated by the following examples.

*Example 1*

A mixture of 10.8 g. sodium hydride and 250 ml. dimethyl sulfoxide is heated with stirring at 65–70° C. until evolution of hydrogen ceases. The solution is diluted with 600 ml. tetrahydrofuran, cooled to −10° C., and 92 g. of trimethylsulfonium iodide is added. The resulting mixture containing dimethylsulfonium methylide is stirred for 5 minutes at −10° C. and then 49.5 g. 3β-acetoxyandrost-5-en-17-one is added. The mixture is stirred for 2½ hours at −10° C. and for an additional 15 minutes at 25° C. It is then chilled and diluted with 600 ml. water, with external cooling to maintain the temperature below 20° C. The diluted mixture is stirred for 10 minutes and the organic phase is separated and combined with chloroform extracts of the aqueous phase.

The organic phase is washed with water, dried, and evaporated to give a residue of 17β,20-epoxy-17α-methylandrost-5-en-3β-ol; M.P. 172–176° C. following crystallization from acetonitrile. The structural formula is

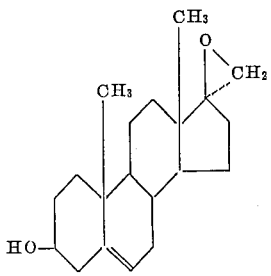

The same product is obtained by the substitution of 3β - propionoxyandrost-5-en-17-one for the 3β-acetoxyandrost-5-en-17-one in the foregoing procedure.

*Example 2*

A stirred mixture of 6.0 g. 17β,20-epoxy-17α-methylandrost-5-en-3β-ol, 350 ml. toluene, and 39 g. cyclohexanone is distilled until about 50 ml. is collected as a distillate. The mixture is cooled slightly and 2.0 g. aluminum isopropoxide is added. With efficient stirring, the mixture is heated at reflux for one hour, cooled, washed with a saturated aqueous solution of sodium potassium tartrate, and distilled with steam until 2 liters of distillate is collected. The remaining mixture is chilled and the insoluble product collected on a filter, washed with water, and dried. It is 17β,20-epoxy-17α-methylandrost-4-en-3-one. For purification, this product is dissolved in 1:1 isopropyl ether-hexane and the solution passed over a chromatography column prepared with alumina. The product is eluted with additional portions of 1:1 isopropyl ether-hexane and recovered by evaporation of the solvent. Following crystallizations from aqueous propanol and from isopropyl ether, it has M.P. 175–178° C. The structural formula is

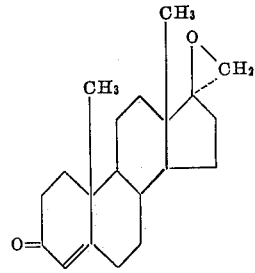

I claim:
1. A member of the class consisting of 17β,20-epoxy-17α-methylandrost - 5 - en-3β-ol and 17β,20-epoxy-17α-methylandrost-4-en-3-one.
2. 17β,20-epoxy-17α-methylandrost-5-en-3β-ol.
3. 17β,20-epoxy-17α-methylandrost-4-en-3-one.

References Cited by the Examiner
UNITED STATES PATENTS

| | | | |
|---|---|---|---|
| 2,265,143 | 12/1941 | Butenandt et al. | 260—348 |
| 3,133,913 | 5/1964 | Deghenghi | 260—239.55 |
| 3,174,970 | 3/1965 | Muller et al. | 260—239.55 |

LEWIS GOTTS, *Primary Examiner.*

H. A. FRENCH, *Assistant Examiner.*